US012792228B2

(12) United States Patent
N et al.

(10) Patent No.: US 12,792,228 B2
(45) Date of Patent: Nov. 10, 2026

(54) DATA STORAGE DEVICE AND METHOD FOR SPECULATION-DRIVEN PARTIAL SHUTDOWN

(71) Applicant: Western Digital Technologies, Inc., San Jose, CA (US)

(72) Inventors: Rohan Goel N, Mysore (IN); Ramanathan Muthiah, Bengaluru (IN); Sekkulandai Kuppuswamy Gnanasekar, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/897,295

(22) Filed: Sep. 26, 2024

(65) Prior Publication Data

US 2026/0086723 A1 Mar. 26, 2026

(51) Int. Cl.
*G06F 3/06* (2006.01)

(52) U.S. Cl.
CPC .......... *G06F 3/0619* (2013.01); *G06F 3/0653* (2013.01); *G06F 3/0673* (2013.01)

(58) Field of Classification Search
None
See application file for complete search history.

(56) References Cited

U.S. PATENT DOCUMENTS 10,452,123 B2 * 10/2019 Klein .................... G06F 1/3296
11,086,737 B2 8/2021 Peltz et al.
11,379,155 B2 * 7/2022 Zhou .................... G06F 3/0659
11,422,726 B1 * 8/2022 Jo .......................... G06F 3/067
11,797,445 B2 10/2023 Moshe et al.
2009/0019265 A1 * 1/2009 Correale, Jr. ......... G06F 1/3246 712/216
2012/0011303 A1 1/2012 Iwasaki et al.
2014/0082406 A1 * 3/2014 Erez .......................... G06F 1/30 714/2
2017/0084328 A1 3/2017 Hsu et al.
2017/0177069 A1 * 6/2017 Bedare .................... G06F 1/263
2017/0277245 A1 * 9/2017 Paley ........................ G06F 1/30
2018/0024919 A1 * 1/2018 Geml .................... G06F 3/0659 711/103
2019/0087275 A1 * 3/2019 Nakatsuka ............ G06F 3/0659
2020/0097188 A1 3/2020 Gunda et al.
2020/0264954 A1 * 8/2020 Belgaied ............... G06F 3/0619
2022/0100403 A1 * 3/2022 Tiwari ................ G06F 11/1441
2022/0350535 A1 * 11/2022 Song ..................... G06F 1/3275
2023/0376218 A1 * 11/2023 Garcia Redondo ... G06F 3/0673

* cited by examiner

*Primary Examiner* — Jared I Rutz
*Assistant Examiner* — Alexander J Yoon

(57) ABSTRACT

A data storage device and method are provided for speculation-driven partial shutdown. In one embodiment, a data storage device is provided comprising a memory and one or more processors. The one or more processors, individually or in combination, are configured to: receive, from a host, a speculation weight indicative of an impending ungraceful shutdown of the data storage device; determine whether the speculation weight is above a threshold; and in response to determining that the speculation weight is above the threshold, perform a partial shutdown of the data storage device. Other embodiments are disclosed.

19 Claims, 10 Drawing Sheets

DATA STORAGE DEVICE AND METHOD FOR SPECULATION-DRIVEN PARTIAL SHUTDOWN

BACKGROUND

Data stored in a volatile memory buffer in a data storage device can be lost when power is no longer supplied to the data storage device from a host. If the host provides notice to the data storage device of an upcoming shutdown, the data storage device can use the opportunity to flush data from the volatile memory buffer to non-volatile memory, thereby avoiding data loss. This is referred to as a graceful shutdown. However, without such notice, such as when there is a sudden or abrupt power loss, the data storage device lacks the opportunity to flush data from the volatile memory buffer to the non-volatile memory, and data loss can occur. This is referred to as an ungraceful shutdown. Some data storage devices are equipped with capacitors to provide the data storage device with enough power to flush data from the volatile memory buffer to the non-volatile memory even without power from the host.

DETAILED DESCRIPTION

Figure 1A:
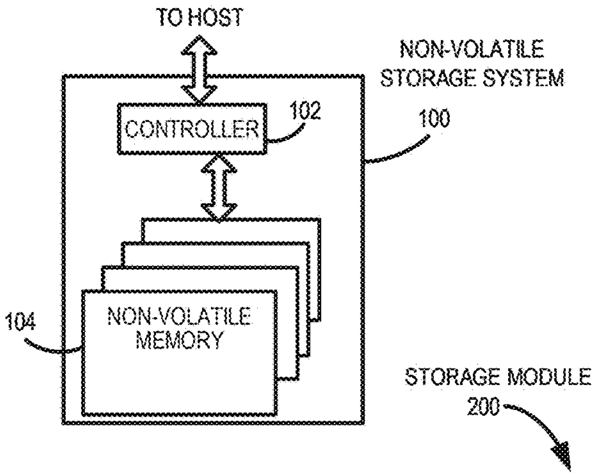
FIG. 1A is a block diagram of a data storage device of an embodiment.

The following embodiments generally relate to a data storage device and method for speculation-driven partial shutdown. In one embodiment, a data storage device is provided comprising a memory and one or more processors. The one or more processors, individually or in combination, are configured to: receive, from a host, a speculation weight indicative of an impending ungraceful shutdown of the data storage device; determine whether the speculation weight is above a threshold; and in response to determining that the speculation weight is above the threshold, perform a partial shutdown of the data storage device.

In some embodiments, the one or more processors, individually or in combination, are further configured to: determine whether the speculation weight is above a second threshold; wherein the partial shutdown that is performed is relatively more aggressive if the speculation weight is above the second threshold than if the speculation weight is not above the second threshold.

In some embodiments, the partial shutdown comprises storing updates to a logical-to-physical address table in both a volatile memory of the data storage device and in a temporary backup block in the non-volatile memory.

In some embodiments, the partial shutdown comprises evicting updates to a logical-to-physical address table stored in a volatile memory and writing future updates to the logical-to-physical address table directly to the non-volatile memory.

In some embodiments, the partial shutdown comprises padding an open wordline in block of the non-volatile memory and flushing corresponding parity bits to the non-volatile memory.

In some embodiments, the partial shutdown comprises foregoing opening a new block for writing data.

In some embodiments, the partial shutdown comprises transferring contents of a volatile memory in the data storage device to the non-volatile memory in response to receiving a host-initiated cache flush command.

In some embodiments, the partial shutdown comprises writing host data to the non-volatile memory without temporarily caching the host data in a volatile memory in the data storage device.

In some embodiments, the partial shutdown comprises storing host data in single-level cell (SLC) blocks in the non-volatile memory instead of in multi-level cell (MLC) blocks in the non-volatile memory.

In some embodiments, the partial shutdown comprises prioritizing an incoming host write command over a garbage collection operation.

In some embodiments, the one or more processors, individually or in combination, are further configured to internally speculate regarding the impending ungraceful shutdown of the data storage device and proactively trigger a backend operation.

In some embodiments, the data storage device is part of a single-root input/output virtualization (SRIOV) environment.

In some embodiments, the memory comprises a three-dimensional memory.

In another embodiment, a method is performed in a host in communication with a data storage device. The method comprises: determining whether a number of pending host input/output commands in the data storage device is above a threshold; in response to determining that the number of pending host input/output commands in the data storage device is above the threshold, generating a value indicating a probability of an impending ungraceful shutdown of the data storage device; and sending the value to the data storage device.

In some embodiments, the method further comprises determining whether the host is in a critical power state or whether there is a virtual machine failure in the host; wherein determining whether the number of pending host input/output commands in the data storage device is above the threshold is performed in response to determining whether the host is in the critical power state or whether there is the virtual machine failure in the host.

In some embodiments, the value is generated based on a history of prior ungraceful shutdowns of the data storage device, a history of power-related issues of the data storage device, a health parameter of the data storage device, a criticality of the pending host input/output commands, and/or a user configuration.

In some embodiments, the value is generated based on a severity of a host power state and/or the number of pending host input/output commands in the data storage device.

In some embodiments, the method further comprises: determining whether the value is above a second threshold, wherein the value is sent to the data storage device in response to the value being above the second threshold.

In some embodiments, the method further comprises: determining whether the data storage device is in a partial-shutdown mode; and cancelling the partial-shutdown mode in response to determining that the value is above the second threshold and that the data storage device is in the partial-shutdown mode.

In another embodiment, a data storage device is provided comprising: a memory; and means for: receiving, from a host, a probability of an ungraceful shutdown of the data storage device; determining whether the probability is above a threshold; and in response to determining that the probability is above the threshold, performing an action to reduce a likelihood of data loss if there is an ungraceful shutdown of the data storage device.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1B:
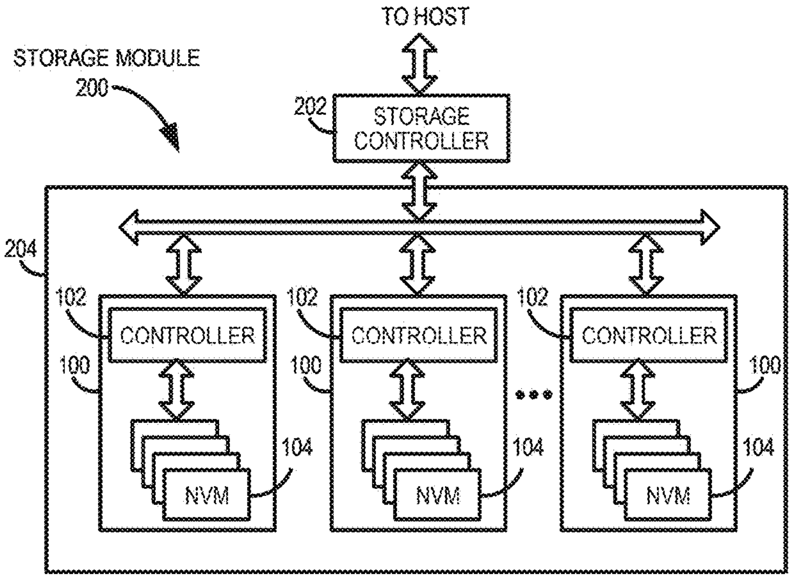
FIG. 1B is a block diagram illustrating a storage module of an embodiment.
Figure 1C:
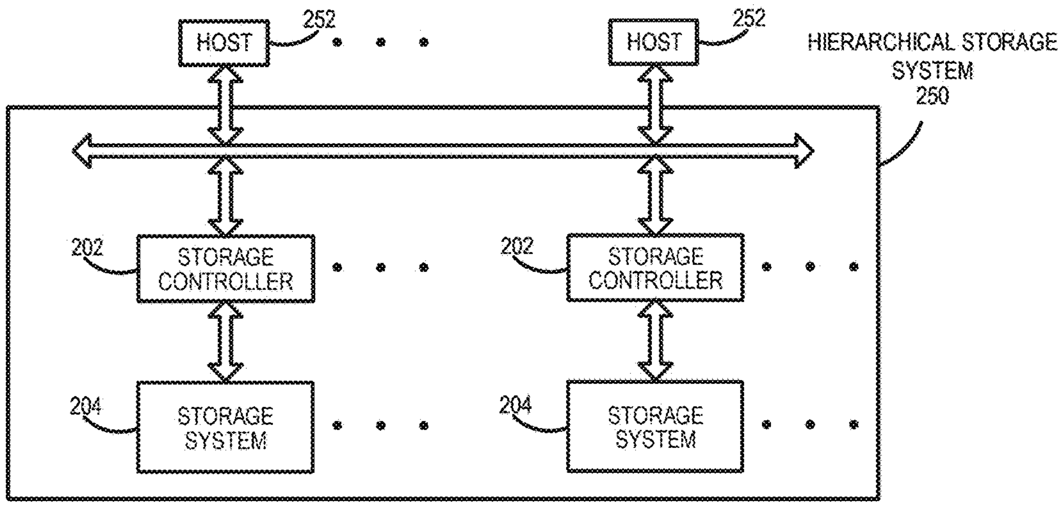
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
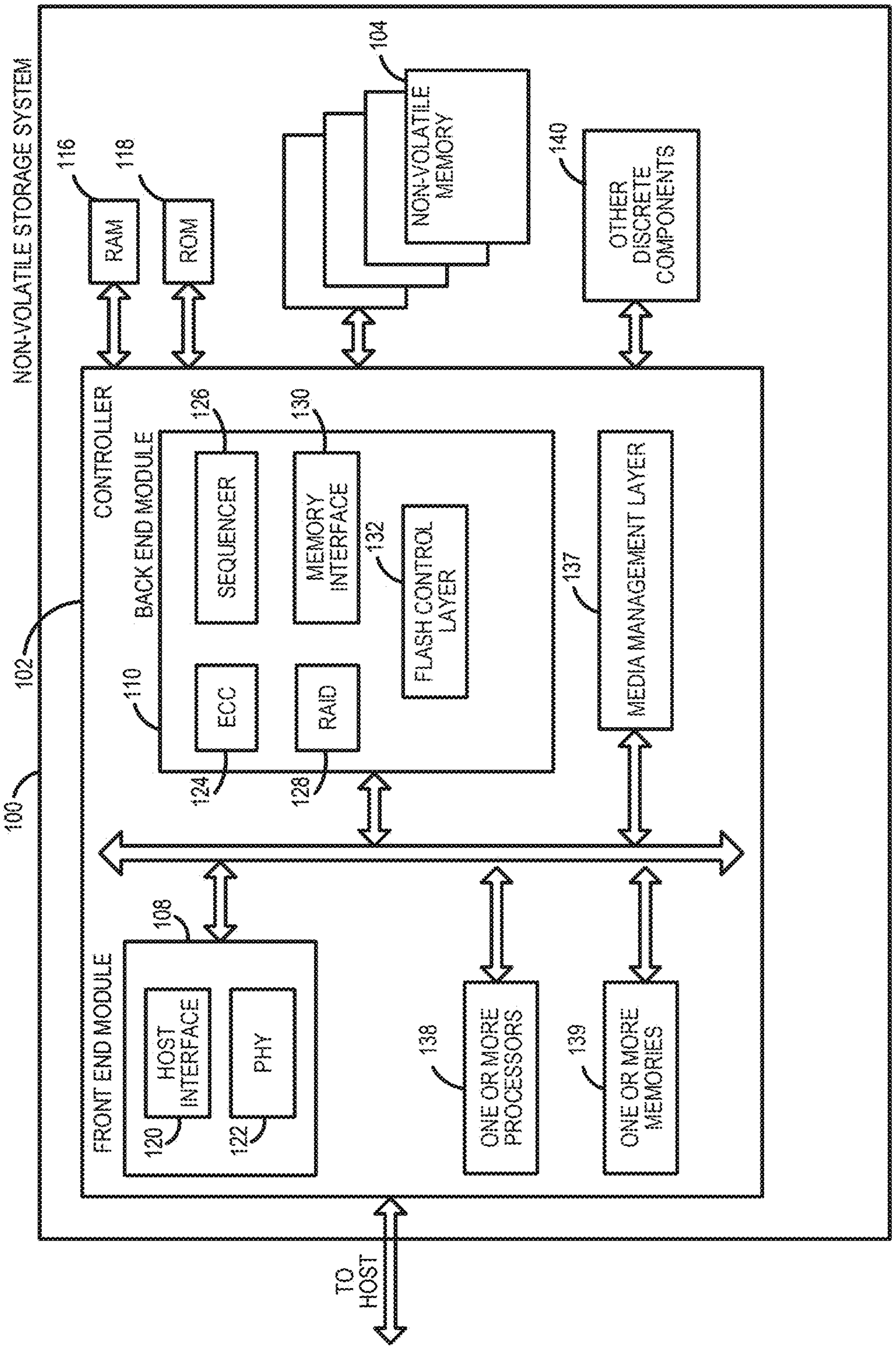
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
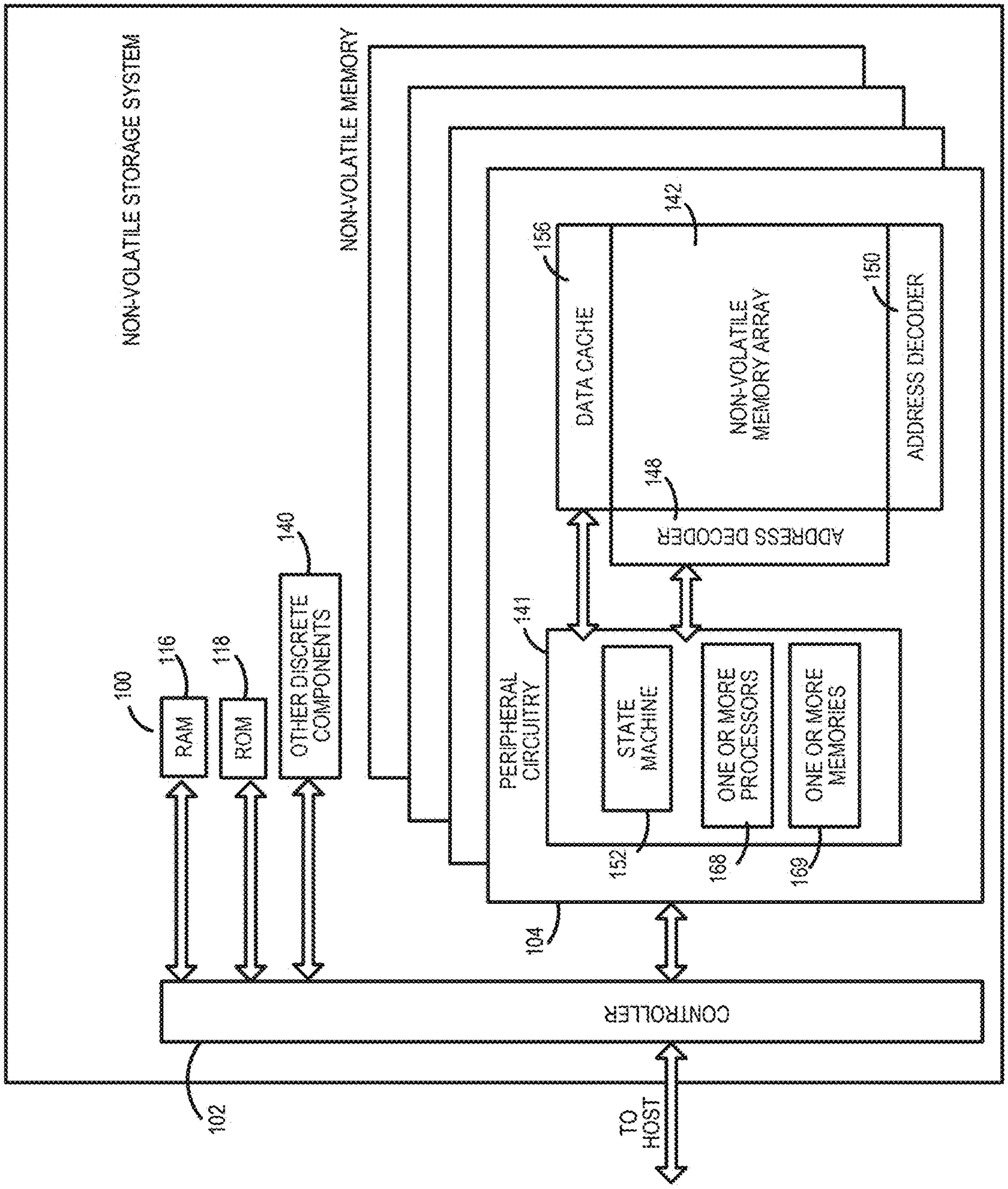
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
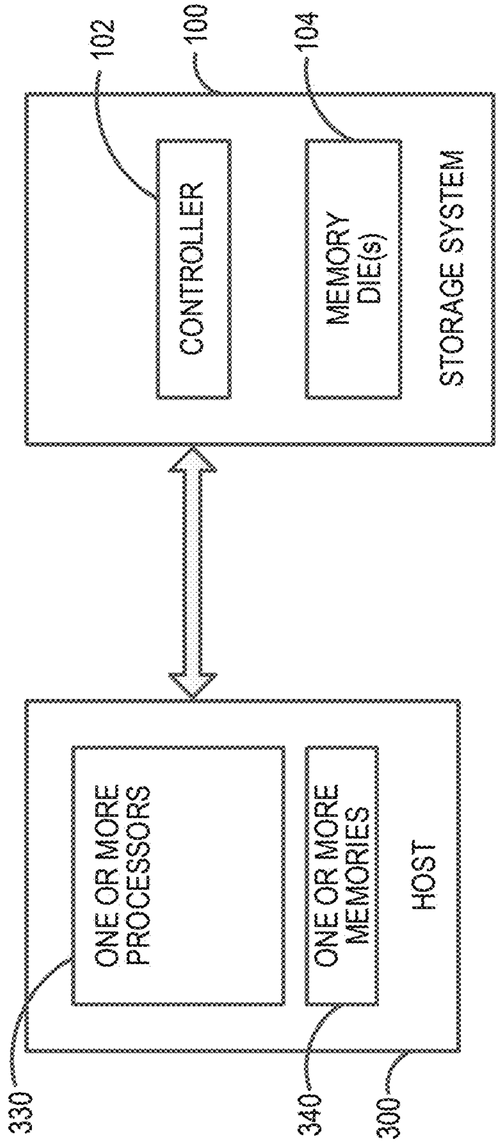
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Data storage devices built on NAND flash memory (such as solid-state drives (SSDs)) offer compelling advantages, including high input/output (I/O) performance, low power consumption, and resilience to shocks. However, the inherent limitations of NAND flash memory, such as erase-before-write constraints and a finite program erase count (PEC), can diminish the lifespan of the data storage device when faced with a surge in write requests. To mitigate this issue, many data storage device incorporate several internal RAM-based volatile write buffers, which serve to enhance write performance and prolong longevity of the data storage device by absorbing a portion of the write operations directed toward the NAND flash memory. The data storage device's internal buffer is used to store not only host data but also meta information of the flash translation layer (FTL), such as a logical-to-physical (L2P) map (e.g., table or other data structure). Conventional data storage devices can require a large L2P mapping table, typically equivalent to 0.1% of the storage capacity.

During a graceful shutdown (GSD) of the data storage device 100, prior to fulfilling the shutdown request from the host 300, the controller 102 of the data storage device 100 has the opportunity to flush the data residing in volatile write buffers to the non-volatile NAND memory 104. Concurrently, the controller 102 can resolve all delta entries in part of the volatile cache memory, thereby ensuring the L2P mapping remains updated in the non-volatile memory 104. Additionally, the controller 102 can dedicate time to complete any necessary housekeeping operations before the shutdown. This comprehensive process help guaranty the absence of pending commands in the data storage device 100 before shutdown, thereby mitigating the risk of data loss or corruption.

In contrast to a graceful shutdown, an ungraceful shutdown (UGSD) results form a sudden or abrupt power loss in the data storage device 100 when the controller 102 of the data storage device 100 is abruptly interrupted in the midst of ongoing operations. Consequently, the controller 102 lacks the opportunity to address all pending commands in the system 100 or to flush the data residing in cache memory/buffers. This leads to the loss of data stored in volatile write buffers (cache memory), which could be a good amount of data, including the L2P delta entries. A system scan of the data storage device 100 can evaluate the extent of damage caused by the ungraceful shutdown in terms of data loss/corruption. Additionally, during the scan, reconstructing the lost delta entries due to the power loss can uphold data integrity. During an ungraceful shutdown, all pending commands queued in the cache memory, as well as the current command under execution, are abruptly aborted. This can lead to user data loss or corruption. Therefore, recovering from an abrupt power loss or ungraceful shutdown is not only a time-consuming and intensive operation but also almost always results in an unrecoverable data loss/corruption scenario.

So, despite the advantages they offer, volatile write buffers, by themselves, do not guarantee the preservation of buffered data in case of sudden power loss or an ungraceful shutdown. To address this problem, some data storage device, such as enterprise SSDs, have a capacitor (a "super-cap") that ensures an ungraceful shutdown never happens. Storage solutions in the client and retail segment do not have super-cap support and, hence, are prone to ungraceful shutdowns especially when the power from a battery-operated host is in critical state, where there is a hardware failure in the host, when a buggy operating system (OS) state machine leads to a system watchdog, or when the storage commands are queued in a driver.

Also, while a host typically enters a low-power (LP) state machine to save power, there could still be ongoing storage I/O requests that can result in an ungraceful shutdown in the data storage device. In such situations, an ungraceful shutdown cannot be stopped in entirety; however, the losses from the ungraceful shutdown can be minimized with proactive actions based on logical speculations.

The following embodiments address these issues by providing a proactive approach to anticipating an impending ungraceful shutdown at the host side 300, so that the data storage device 100 can take steps for that anticipation. By preemptively speculating the likelihood of an ungraceful shutdown, appropriate preventive measures can be taken by the host 300 and/or the data storage device 100 to mitigate or minimize the potential damage to data reliability and integrity.

More specifically, in one embodiment, a host driver in the host 300 can determine that the ongoing I/O requests in a storage driver in the data storage device 100 are more than a threshold. The host driver can be implemented by the host's one or more processors 330, individually or in combination, executing computer-readable program instructions/code stored in the one or more memories 340 of the host 300. Similarly, the storage driver can be implemented by the data storage device's one or more processors 138, individually or in combination, executing computer-readable program instructions/code stored in one or more memories in the data storage device 100. Also, while host driver and storage driver are used in this example, it should be understood that other implementations are possible.

The ongoing I/O requests in the storage driver can be more than the threshold even at a time when the power state of the host 200 is critical, when there is a hardware failure in the host 300), or when there is a buggy operating system (OS) state machine that can lead to a system watchdog, for example. In this situation, the host's one or more processors 330, individually or in combination, can evaluate each of the above parameters, such that it proactively hints a speculative ungraceful shutdown to the controller 102 of the data storage device 100 when a threshold hits, and the controller 102 is configured to perform a partial shutdown based on the speculative ungraceful shutdown information to ensure that the data loss is nil or minimal prior to an actual typical shutdown (graceful of ungraceful) of the data storage device 100. The partial shutdown in the data storage device 100 can include the controller 102 tweaking the default thresholds to minimize host data loss (such as frequent usage of forced unit access (FUA)), as well as control data loss (e.g., L2P journal data) in the volatile cache, on receiving a speculative hint.

Figure 4:
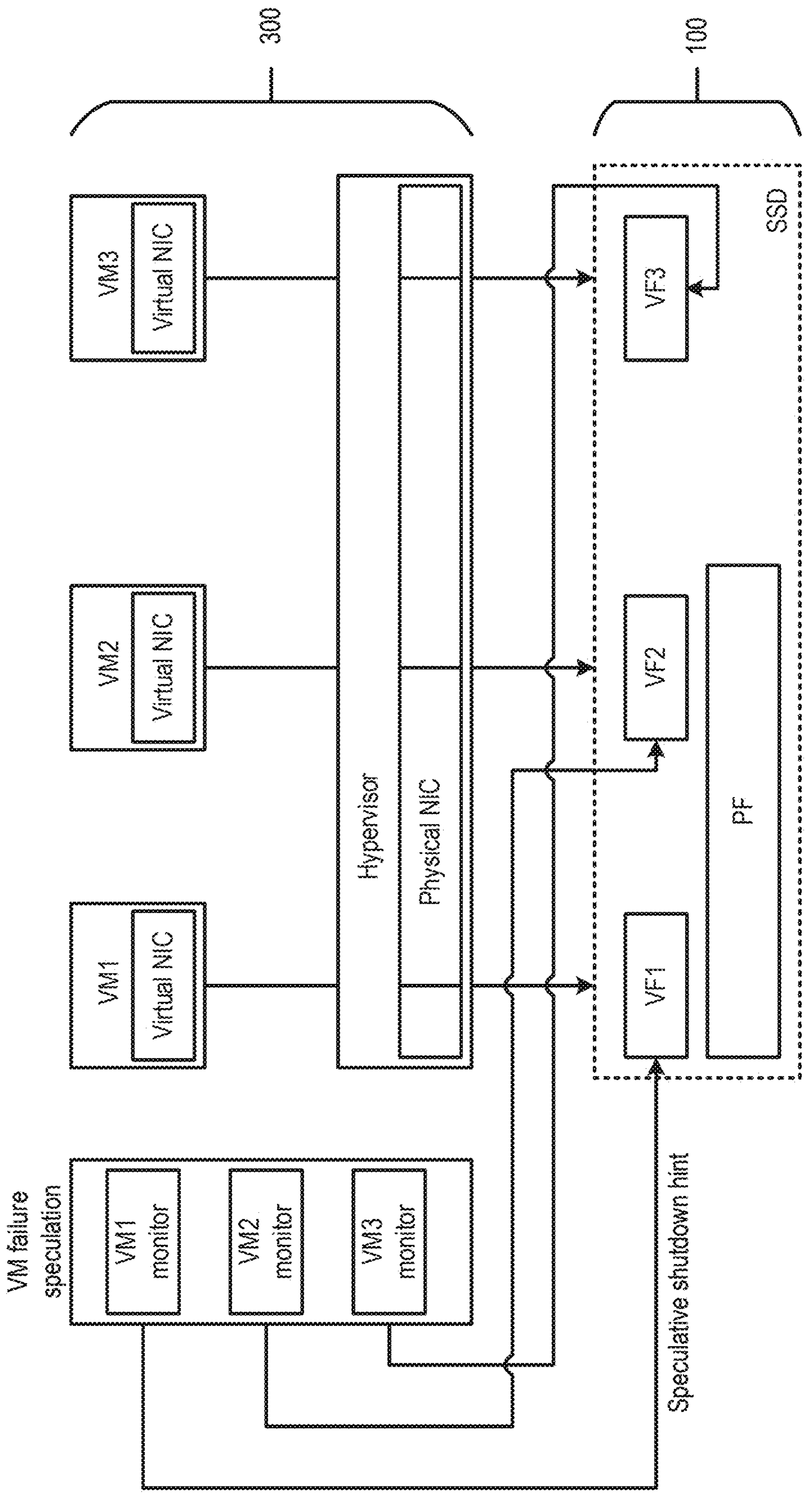
FIG. 4 is a block diagram of a single-root input/output virtualization (SRIOV) environment of an embodiment.

It may be noted that in virtual machines (VMs), improper handling of virtual machine shutdowns can also lead to ungraceful shutdowns of the underlying data storage device that the virtual machine relies on. A modified method can be applied to optimize the recovery in single-root IO virtualization (SRIOV) systems, an example of which is shown in FIG. 4. In this embodiment, the hypervisor (the software part of host system 300) sends a hint or a weight to a virtual function (VF) in the data storage device 100 on a speculative shutdown of that VM based on a system failure (e.g., OS or a similar failure in the driver), and the data storage device 100 is configured to take steps to temporarily focus most of its resources in the physical function (PF) to address the impacted VM towards a partial and minimal loss of that VF on receiving the speculative hint. The VM can be impacted by any of the methods discussed above, such as OS state machine due to software bugs or hardware failures based on which a speculation hint and a weight can be generated. Thus, this embodiment may provide advantages in a SR-IOV system when the failure in the VM results in impacting the VF in the device. It may be noted that the system deadlock in this case at the VM side can lead to a frozen state in the device side on par with an ungraceful shutdown irrespective of whether power is available to the data storage device 100.

More generally, the host 300 (e.g., using a host driver) can share a speculation weight based on a failure type for a speculative hint based on which the controller 102 of the data can fine-tune its speculative shutdown thresholds to help avoid data loss in the event of an ungraceful shutdown. The speculation weight (or, more generally, a value/confidence level) can be indicative of the probability of an ungraceful shutdown of the data storage device 100. The host 300 can additionally bias different write streams in terms of priority in the shutdown event such that the controller 102 can focus on moving the data associated with a priority data stream to the non-volatile memory 102 on high priority when it receives a speculative hint. The host 300 can have a system threshold for the host power state or associated to a state machine and the queued storage IO to determine when to send the speculative shutdown hint to the data storage device 100. The method can be triggered in a timeline that is ahead of a graceful shutdown or an ungraceful shutdown based on a host evaluation of a critical state. These embodiments can be used to minimize data loss irrespective of the power state, as well as enhance the quality of service (QOS) during device initialization if the speculation turns out to be true resulting in an ungraceful shutdown.

In one example use case, if the hibernating host system 300 is on low power (battery powered), the host system 300 can hibernate (e.g., send a set of write commands) to the data storage device 100 with corresponding speculative shutdown weights, so that the controller 102 of the data storage device 100 can take various actions, as discussed below. It may be noted that the impact of a power outage during hibernation can lead to longer resume times and potential data loss. Additionally, the host 300 can have logic to determine from the historic data if a power loss is imminent for the available set of storage commands in its driver.

One embodiment will now be illustrated in the context of a single root I/O virtualization (SR-IOV) architecture. The following paragraphs delineate the respective responsibilities of the host 300 (e.g., the host driver) and the controller 102 of the data storage device 100, outlining how each component collaborates to mitigate the impact of potential ungraceful shutdowns on data integrity. It should be understood that these are merely examples and that other implementations can be used. For example, these embodiments can be used in a data storage device that are not part of a single root I/O virtualization (SR-IOV) environment.

In general, in this embodiment, the host 300 (e.g., the host driver) is responsible for determining if the data storage device 100 should enter partial shutdown mode by speculating an impending ungraceful shutdown. The host 300 can evaluate ongoing IO requests against predefined thresholds, particularly when the host's power state is below a threshold (e.g., when the host's power state becomes critical). Based on this assessment, the host 300 can decide whether to issue a speculative ungraceful shutdown hint to the data storage device 100. In a single root I/O virtualization (SR-IOV) architecture, the failure of a virtual machine (VM) due to hardware malfunction or a buggy operating system state can lead to an ungraceful shutdown of the corresponding virtual function (VF) associated with that VM in the data storage device 100. This scenario poses a risk of data loss or corruption within the VF's storage context. To preemptively address this risk, the hypervisor, which constitutes the host system software component of the SR-IOV system, can speculate on the potential shutdown of the VM.

This speculation decision primarily depends on the host's power state and the number of active/queued IO commands in the driver. If these parameters exceed predefined thresholds, indicating an increased risk of data loss, the host 300 can send the speculative ungraceful shutdown hint to the data storage device 100 along with an appropriate speculative weight that reflects the severity of the situation. The speculative weight provided by the host 300 with the notification of an impending ungraceful shutdown can be determined based on various criteria, including:

Power State Severity: The severity of the host's power state, such as critically-low battery levels or unstable power sources, can influence the speculative weight. Higher weights can be assigned to more-severe power states indicating a higher likelihood of an ungraceful shutdown.

Current Workload: The magnitude of ongoing requests or workload in the storage driver can be considered. A heavier workload (greater than a pre-defined threshold) can increase the likelihood of data loss in the event of an ungraceful shutdown, warranting a higher speculative weight.

Historical Data: Past occurrences of ungraceful shutdowns or instances of power-related issues can inform the speculative weight. If the system has experienced frequent ungraceful shutdowns or power fluctuations in the past, a higher weight can be assigned to anticipate similar events.

System state/health monitoring: Real-time monitoring of system state/health parameters, such as temperature, active threads, RAM usage, and hardware integrity, can contribute to determining the speculative weight. Anomalies in these parameters may warrant a higher weight.

Application Criticality: The criticality of the applications or data currently being processed by the data storage device 100 can influence the speculative weight. More-critical data or applications can require a higher weight to ensure their integrity in the event of an ungraceful shutdown.

User Configuration: Users can have the option to configure the speculative weight based on their specific requirements or preferences. This customization can allow users to prioritize certain factors or tailor the system's response to their individual needs.

Figure 5:
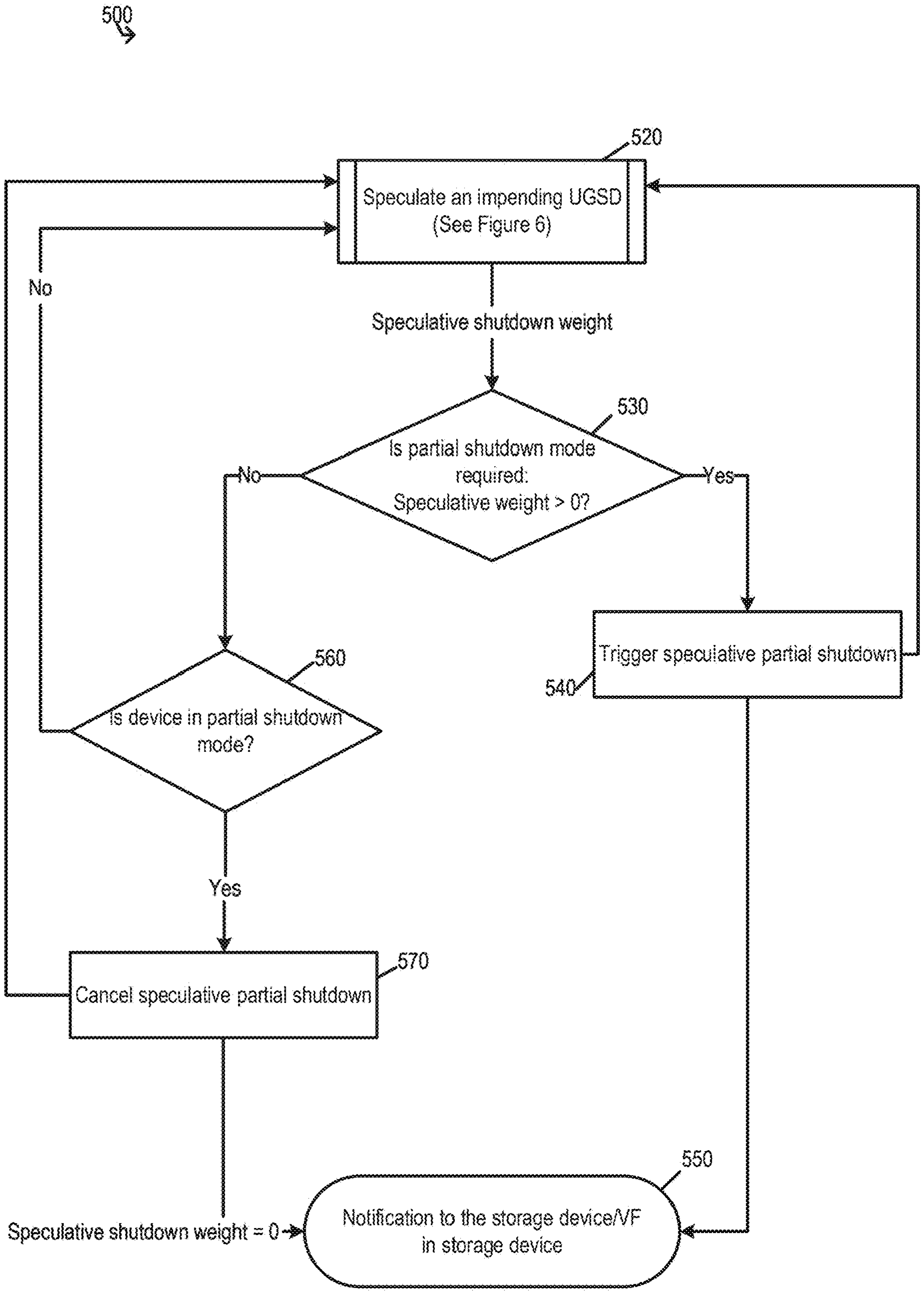
FIGS. 5 and 6 are flow charts of a method performed by a host of an embodiment for speculation of an ungraceful shutdown.
Figure 6:
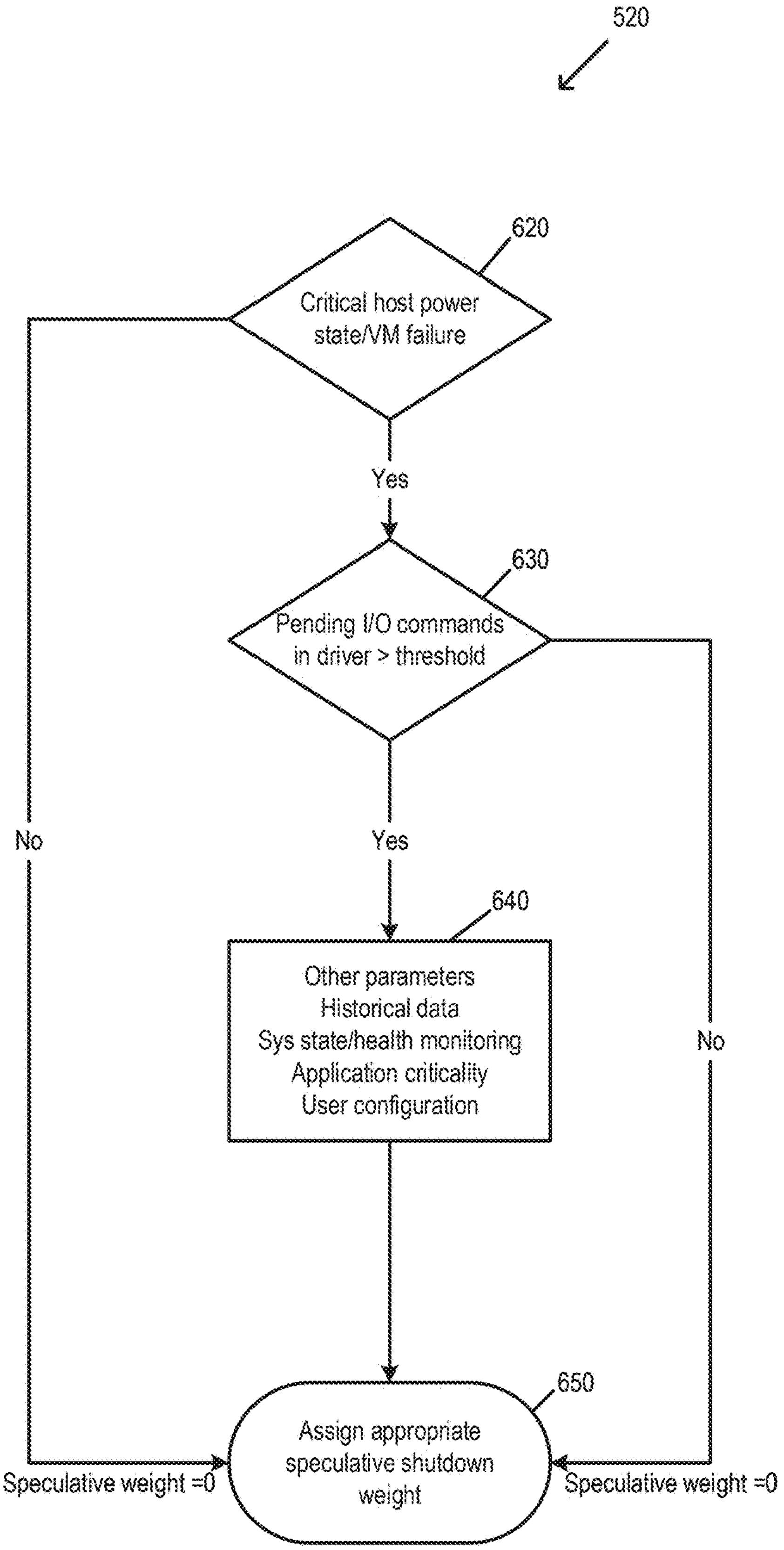

Turning again to the drawings, FIGS. 5 and 6 are flow charts of an example method of an embodiment performed by the host 300 for speculation of an ungraceful shutdown. During this flow, if the conditions leading to a speculative shutdown change, the host 300 can cancel the speculative shutdown notification issued to the data storage device 100.

As shown in the flow chart 500 in FIG. 5, at the host 300 speculates an impending ungraceful shutdown (520). FIG. 6 shows this process in more detail. As shown in FIG. 6, the host 300 (e.g., the one or processors 330, individually or in combination) determines if there is a critical host power state or a VM failure (620). If there isn't, a speculative weight of zero is assigned (650). If there is, the host 300 determines if the pending number of I/O commands in the data storage device 100 (e.g. in the storage driver) is above a threshold (630). If the pending number of I/O commands is not above the threshold, a speculative weight of zero is assigned (650). However, if the pending number of I/O commands is above the threshold, the host 300 considers one or more parameters (e.g., historical data, system state/health monitoring, application criticality, user configuration, etc.) (640) and assigns the appropriate speculative shutdown weight (650).

Referring back to FIG. 5, after the appropriate speculative shutdown weight has been assigned, the host 300 determines if partial shutdown mode is required (e.g., by determining if the speculative weight is greater than zero) (530). If the host 300 determines that partial shutdown mode is required, the host 300 triggers a speculative partial shutdown (540) and sends a notification to the data storage device 100 (or to the VF in the data storage device 100) (550). The method also loops to 520. However, if the host 300 determines that partial shutdown mode is not required, the host 300 determines if the data storage device 100 is in partial shutdown mode (560). If the data storage device 100 is not in partial shutdown mode, the method loops back to 520. However, if the data storage device 100 is in partial shutdown mode, the host 300 cancels the speculative partial shutdown (570), and the method loops to 520. The host 300 also sets the speculative shutdown weight to zero and the sends a notification to the data storage device 100 (or to the VF in the data storage device 100) (550).

On the data storage device 100 side, the handling of speculative weights plays a role in mitigating the potential impact of ungraceful shutdowns on data reliability and integrity. By receiving speculative weights from the host 300, the controller 102 of the data storage device 100 can dynamically adjust its shutdown procedures based on the severity of the anticipated shutdown event. For instance, if the speculative weight falls below an actionable threshold, the controller 102 can continue its standard operation without taking additional actions. Conversely, if the speculative weight surpasses the actionable threshold but remains below a pre-defined secondary threshold, the controller 102 can initiate moderate preventive measures. Should the speculative weight exceed this secondary threshold, the controller 102 can implement more-aggressive actions to mitigate potential risks. Determining these thresholds can rely on factors such as flash translation layer (FTL) schemes and controller capabilities aimed at minimizing data loss in power loss scenarios.

The following paragraphs provide an example use case of device-side safeguard mechanisms in speculative shutdown mode. It should be understood that these are merely examples and that other implementations can be used.

In one embodiment, the controller 102 of the data storage device 100, on receiving a speculative hint from the host 300, prepares for a state machine that is lossless (e.g., equal to that of a graceful shutdown) or less lossy than an impromptu ungraceful shutdown. The preparation for partial shutdown can include minimizing the L2P journal entries as well as minimizing the data in the volatile cache. For instance, in some cases, on receiving the proposed speculative ungraceful shutdown hint, the controller 102 can internally apply forced user access (FUA) at a predetermined frequency wherein the controller 102 flushes every write command to the non-volatile memory 104, thereby minimizing loss occurring owing to a potential ungraceful shutdown. In some cases, the controller 102 can increase the frequency of master table (MIP) flush on receiving the proactive hint.

More generally, upon receiving a speculative shutdown hint from the host 300, the controller 102 can have the discretion to determine whether to employ, and at what frequency to employ, one or more of the following safeguard mechanisms. Again, these are merely examples, and other/different mechanism can be used.

Logical to physical (L2P) table update optimization: The L2P table can be regularly updated using deltas that are stored in the volatile cache memory before being flushed to the L2P table in the non-volatile memory 104. However, abrupt power loss can jeopardize these updates, leading to data inconsistency. To mitigate this risk, the controller 102 can use a proactive dual-copy mechanism or a proactive eviction strategy on receiving a speculative ungraceful shutdown hint from the host 300. With the dual-copy mechanism, upon receiving a speculative ungraceful shutdown hint, the controller 102 can transfers existing delta entries to a temporary backup block in the non-volatile memory 104 (e.g., into an SLC block). This can help ensure redundancy, with delta entries stored in both the volatile memory and the non-volatile backup block simultaneously. In the event of power loss, lost entries can be swiftly recovered from the backup block during device re-initialization. Alternatively, the controller 102 can choose to evict all existing delta entries from the volatile memory, directing subsequent host operations to directly update the L2P table in the non-volatile memory 103. This eliminates the need for related operations, reducing the risk of data loss during an ungraceful shutdown. However, it may temporarily increase NAND write requests, potentially impacting performance and longevity if used frequently. Moreover, during the period when deltas are directly updated to the non-volatile memory 104, host read performance can be enhanced by caching more address pages. Both approaches alleviate the need for reconstructing lost delta entries after the ungraceful shutdown, ensuring data integrity and operational efficiency in the face of sudden power loss.

Parity handling in the data storage device 100 during partial shutdown: When the controller 102 receives speculative ungraceful shutdown hints, it can take steps to pad any open wordlines in a block that are not involved in the ongoing I/O operations. The controller 102 can additionally flush the corresponding exclusive-or (XOR) parity associated with the committed data at a higher frequency than typical cases when it determines that the chances of an ungraceful shutdown are high (reflected by the speculative weight assigned by the host 300) in the current device state.

Data retention detection (DRD) handling in the data storage device 100 during partial shutdown: DRD is data retention detection that is done during device initialization to determine the bit-error rate (BER) of last set of written wordlines. If there is an issue because some wordlines are written previously and some would be written now, there can be read differences between the sets of wordlines. Hence, the controller 102 can modify the routing policy to keep the number of open blocks as little as possible to avoid DRD issues once it determines a partial shutdown. For example, the controller 102 can stop opening new blocks for new streams and route the data into an existing open block and share the block for multiple streams to keep the DRD minimal until there is a hint from the host 300 that the speculative shutdown state is lifted back.

FTL operations adjustment: The volatile cache memory plays an important role in enhancing write performance and extending the lifespan of the non-volatile memory 104 by consolidating small transfers into larger groups before writing to the non-volatile memory 104. However, during an unexpected power outage, the data stored in the volatile write cache faces the risk of loss or corruption. To address this issue, the host 300 and data storage device 100 can take proactive measures based on the received speculative weight, such as:

Host-initiated cache flush command: To safeguard data integrity, the host 300 can trigger a "cache flush" command, prompting the controller 102 of the data storage device 100 to transfer volatile cache contents to the non-volatile memory 104. This command persists until the controller 102 confirms completion of the cache flushing process. This strategy may involve the host 300 issuing a "cache flush" after each command until the likelihood of an impending ungraceful shutdown decreases below a threshold (e.g., decreases "significantly"). Additionally, the host 300 can opt to disable the write cache entirely, enhancing resistance to power failures at the cost of potentially reduced write performance.

Device-controlled forced unit access (FUA): Alternatively, the controller 102 of the data storage device 100 can autonomously manage cache flushing through FUA, forcing each write command directly to the non-volatile memory 104 without temporary caching in volatile memory. This can occur at a predetermined frequency based on the received speculative weight from the host 300.

Selective block redirection: The controller 102 of the data storage device 100 can enhance reliability and durability by redirecting host traffic to SLC blocks over MLC blocks in the non-volatile memory 104. The controller 102 may additionally postpone choosing a block of poor health history for writes during the speculative period since an ungraceful shutdown during writes into such block complicates recovery even further.

Priority adjustment for housekeeping operations: In speculative shutdown mode, the controller 102 of the data storage device 100 can lower the priority of non-critical housekeeping operations (such as garbage collection) to prioritize incoming host commands due to the imminent risk of sudden power loss. These operations can be deferred until after an actual shutdown or once the host 300 signals that it no longer anticipates an impending ungraceful shutdown.

Figure 7:
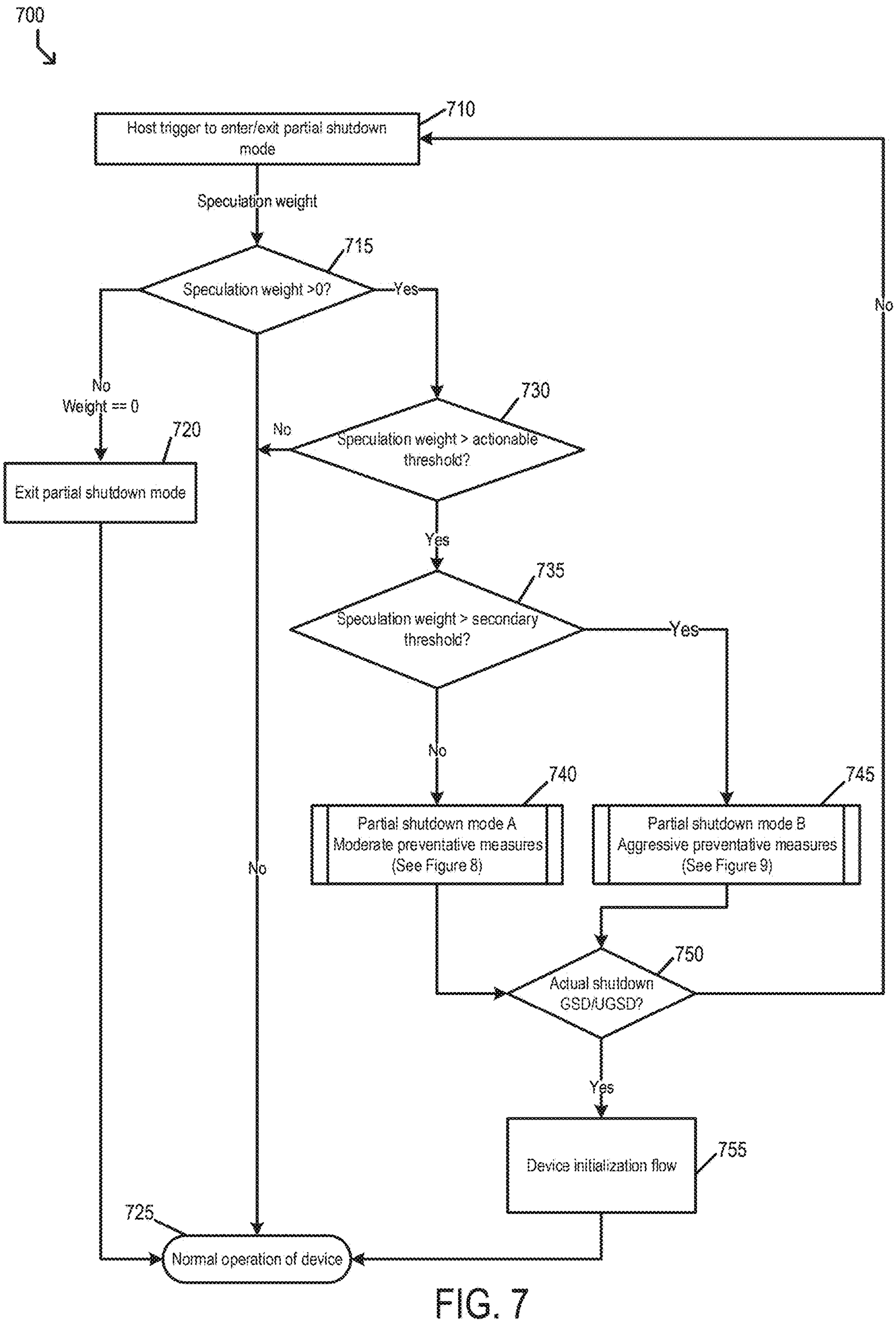
FIGS. 7, 8, and 9 are flow charts of a method performed by a data storage device of an embodiment for a partial shutdown.
Figure 8:
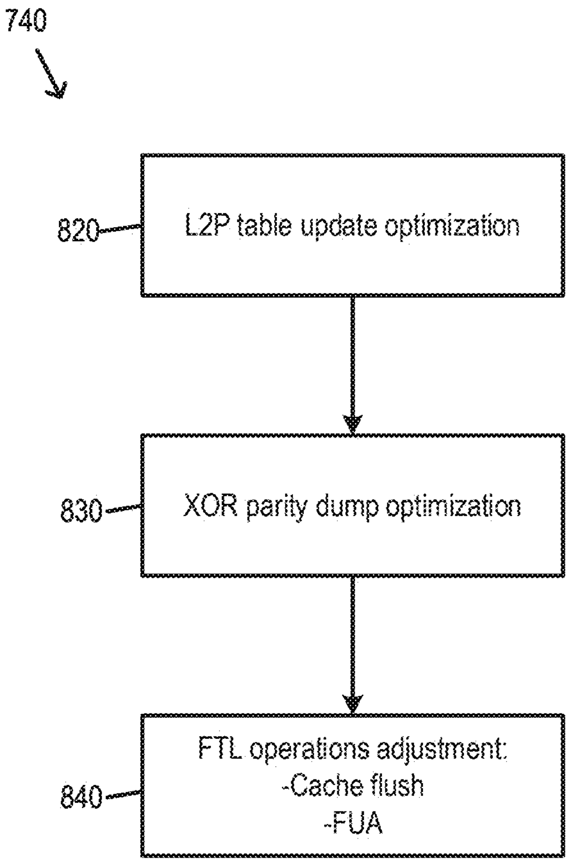
Figure 9:
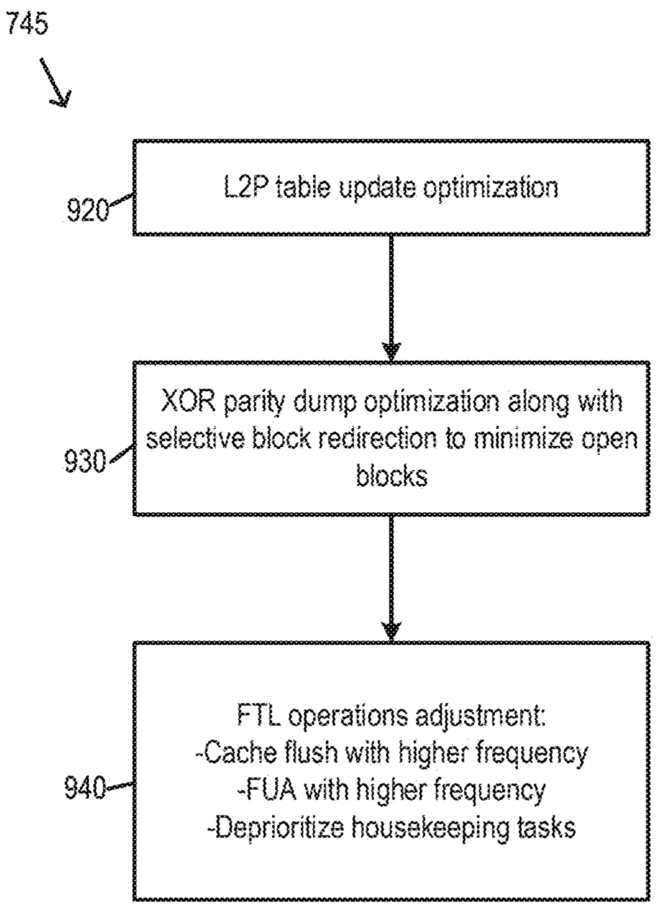

Turning again to the drawings, FIGS. 7, 8, and 9 are flow charts of an example method performed by the data storage device 100 of this embodiment for a partial shutdown. Turning first to the flow chart 700 in FIG. 7, the controller 102 of the data storage device 100 receives a trigger from the host 300 to enter/exit partial shutdown mode, along with a speculation weight (710). The controller 102 then determines if the speculation weight is greater than zero (715). If the speculation weight is zero, the controller 102 exits partial shutdown mode (720) and resumes normal operation of the data storage device 100 (725). If the speculation weight is not greater than zero, the controller 102 resumes normal operation of the data storage device 100 (725). However, if the speculation weight is greater than zero, the controller 102 determines if the speculation weight is greater than an actionable threshold (720).

If the speculation weight is not greater the actionable threshold, the controller 102 resumes normal operation of the data storage device 100 (725). However, if the speculation weight is greater than the actionable threshold, the controller 102 determines if the speculation weight is greater than a secondary threshold (735). If the speculation weight is not greater the secondary threshold, the controller 102 performs a partial shutdown mode ("mode A"), which provides relatively-moderate preventive measures (740). If the speculation weight is greater the secondary threshold, the controller 102 performs a different partial shutdown mode ("mode B"), which provides relatively-aggressive preventive measures (745). These two modes are described in more detail below with reference to FIGS. 8 and 9.

As shown in FIG. 8, in the partial shutdown mode ("mode A") that provides relatively-moderate preventive measures, the controller 102 performs L2P table update optimization (820), XOR parity dump optimization (830), and an FTL operations adjustment (e.g., a cache flush and/or a forced unit access) (840). As shown in FIG. 9, in the partial shutdown mode ("mode B") that provides relatively-aggressive preventive measures, the controller 102 performs L2P table update optimization (920), XOR parity dump optimization along with selective block redirection to minimized open blocks (930), and an FTL operations adjustment (e.g., a cache flush with a higher frequency, forced unit access with a higher frequency), and/or deprioritized housekeeping tasks) (940).

After the selected mode is performed, the controller 102 of the data storage device 100 determines if there was an actual shutdown (either graceful or ungraceful) (750). If there was an actual shutdown, the controller 102 initializes the data storage device 100 (755) and proceeds with normal operation of the data storage device 100 (725). If there was not an actual shutdown, the method loops back to act 710.

Other embodiments of speculative partial shutdown mode can be used. For example, independently, in a data storage device (e.g., a USB) that is additionally prone to end-user triggered ungraceful shutdown, the data storage device 100 can speculate a shutdown (graceful or ungraceful) from parsing file system update events and proactively trigger one or more backend operations to minimize data loss in the event of an ungraceful shutdown. In this alternative, the controller 102 of the data storage device 100 can learn and correlate both the events of file system update and device shut down Independently, the controller 102 of the data storage device 100 can have a module to track power deviations and the associated device shutdowns and use this learning to internally speculate an ungraceful shutdown to the controller 102 (e.g., to an FTL module) when its hardware circuit detects a power variation. The controller 102 of the data storage device 100 can also use this method to speculate and proactively prepare to enter the low power (LP) state wherein it flushes most of the L2P deltas and the host data in the cache to keep the overheads minimum at the time of receiving a host request. Proactive preparation enables entering LP state immediately. Likewise, the turnaround time for a graceful shutdown or entering a LP mode is less, and the loss due to an ungraceful shutdown is nil or less for an ungraceful shutdown. In some cases, the hint involves the host 300 providing a standby time to the data storage device 100 upon which the controller 102 has to prepare to enter LP mode or set up for a graceful shutdown.

There are several advantages associated with these embodiments. For example, these embodiments can help mitigate data loss and help improve data reliability. By proactively anticipating potential ungraceful shutdowns and initiating preventive measures, the speculative partial shutdown mode can minimize the risk of data loss or corruption, thereby enhancing overall data reliability. As another example, these embodiments can enhance system resilience. By detecting critical power states and initiating proactive shutdown procedures, the data storage device can become more resilient to power fluctuations or abrupt shutdown events, thus reducing the likelihood of system instability. As yet another example, these embodiments can optimize performance. The speculative partial shutdown mode allows for fine-tuning of shutdown thresholds based on various criteria, such as workload intensity and system state/health parameters, ensuring that partial shutdown procedures are optimized for minimal disruption to system performance. Further, these embodiments can reduce recovery time. By minimizing the extent of data loss during shutdown events, the speculative shutdown mode can potentially reduce the time and resources required for system recovery and data restoration efforts in the aftermath of an ungraceful shutdown.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising: a non-volatile memory; and one or more processors, individually or in combination, configured to: receive, from a host, a speculation weight; determine whether the speculation weight is above a first threshold; in response to determining that the speculation weight is above the first threshold, perform a partial shutdown of the data storage device; and in response to determining that the speculation weight is not above the first threshold, exit partial shutdown mode; wherein: the speculation weight is not above the first threshold in response to either (i) a number of pending host input/output commands in the data storage device being below a second threshold irrespective of a power state of the host or (ii) the power state being in a predetermined state irrespective of the number of pending host input/output commands in the data storage device; and a type of procedure performed as part of the partial shutdown depends on a value of the speculation weight.

2. The data storage device of claim 1, wherein the one or more processors, individually or in combination, are further configured to: determine whether the speculation weight is above a third threshold; wherein the partial shutdown that is performed is relatively more aggressive in response to determining the speculation weight is above the third threshold than in response to determining the speculation weight is not above the third threshold.

3. The data storage device of claim 1, wherein the partial shutdown comprises storing updates, to a logical-to-physical address table, in both a volatile memory of the data storage device and in a temporary backup block in the non-volatile memory.

4. The data storage device of claim 1, wherein the partial shutdown comprises:

evicting updates to a logical-to-physical address table stored in a volatile memory; and writing future updates to the logical-to-physical address table directly to the non-volatile memory.

5. The data storage device of claim 1, wherein the partial shutdown comprises:

padding an open wordline in a block of the non-volatile memory; and flushing corresponding parity bits to the non-volatile memory.

6. The data storage device of claim 1, wherein the partial shutdown comprises forgoing opening a new block for writing data.

7. The data storage device of claim 1, wherein the partial shutdown comprises transferring contents of a volatile memory in the data storage device to the non-volatile memory in response to receiving a host-initiated cache flush command.

8. The data storage device of claim 1, wherein the partial shutdown comprises writing host data to the non-volatile memory without temporarily caching the host data in a volatile memory in the data storage device.

9. The data storage device of claim 1, wherein the partial shutdown comprises storing host data in single-level cell (SLC) blocks in the non-volatile memory instead of in multi-level cell (MLC) blocks in the non-volatile memory.

10. The data storage device of claim 1, wherein the partial shutdown comprises prioritizing an incoming host write command over a garbage collection operation.

11. The data storage device of claim 1, wherein the one or more processors, individually or in combination, are further configured to:

internally speculate regarding the impending ungraceful shutdown of the data storage device; and proactively trigger a backend operation.

12. The data storage device of claim 1, wherein the data storage device is part of a single-root input/output virtualization (SRIOV) environment.

13. The data storage device of claim 1, wherein the non-volatile memory comprises a three-dimensional memory.

14. The data storage device of claim 1, wherein the predetermined state comprises a critical power state.

15. The data storage device of claim 1, wherein the predetermined state comprises a virtual machine failure in the host.

16. A method comprising: performing in a data storage device: receiving, from a host, a speculation weight; determining whether the speculation weight is above a first threshold; in response to determining that the speculation weight is above the first threshold, performing a partial shutdown of the data storage device; and in response to determining that the speculation weight is not above the first threshold, exit partial shutdown mode; wherein: the speculation weight is not above the first threshold in response to either (i) a number of pending host input/output commands in the data storage device being below a second threshold irrespective of a power state of the host or (ii) the power state being in a predetermined state irrespective of the number of pending host input/output commands in the data storage device; and a type of procedure performed as part of the partial shutdown depends on a value of the speculation weight.

17. The method of claim 16, wherein the predetermined state comprises a critical power state.

18. The method of claim 16, wherein the predetermined state comprises a virtual machine failure in the host.

19. A data storage device comprising: a memory; and means for: receiving, from a host, a speculation weight; determining whether the speculation weight is above a first threshold; in response to determining that the speculation weight is above the first threshold, performing a partial shutdown of the data storage device; and in response to determining that the speculation weight is not above the first threshold, exiting partial shutdown mode: wherein: the speculation weight is not above the first threshold in response to either (i) a number of pending host input/output commands in the data storage device being below a second threshold irrespective of a power state of the host or (ii) the power state being in a predetermined state irrespective of the number of pending host input/output commands in the data storage device; and a type of procedure performed as part of the partial shutdown depends on a value of the speculation weight.

* * * * *